United States Patent [19]

Silla

[11] Patent Number: 5,581,730
[45] Date of Patent: Dec. 3, 1996

[54] CONDITION DETECTOR AND PRIORITIZER WITH ASSOCIATIVITY DETERMINATION LOGIC

[75] Inventor: Mark Silla, Austin, Tex.

[73] Assignee: Advanced Micro Devices, Inc., Sunnyvale, Calif.

[21] Appl. No.: 271,373

[22] Filed: Jul. 6, 1994

[51] Int. Cl.⁶ .................................................. G06F 12/00
[52] U.S. Cl. ............................................. 395/471; 395/483
[58] Field of Search .................................. 395/471, 483, 395/481

[56] References Cited

U.S. PATENT DOCUMENTS

5,265,277  11/1993  Kohn et al. .................... 364/DIG. 1 X

Primary Examiner—David L. Robertson
Attorney, Agent, or Firm—H. Dale Langley, Jr.

[57] ABSTRACT

A device for simultaneously detecting more than one condition, where each condition corresponds to a specific memory cell of an array of more than one memory cell, each specific memory cell of the array having a distinct index given by a first number of bits and a distinct associativity given by a second number of bits, each condition triggers a particular, distinct task, and each task, if more than one, is prioritized.

11 Claims, 5 Drawing Sheets

CONDITION DETECTOR AND PRIORITIZER WITH ASSOCIATIVITY DETERMINATION LOGIC

CROSS-REFERENCE TO RELATED APPLICATIONS

This application is related to U.S. patent application Ser. No. 08/271,105 (06940/0064; TTO235), titled CACHE CONTROLLER INDEX ADDRESS GENERATOR, of the same inventor. The related application is filed on even date herewith, is assigned to the assignee of the present invention, and is hereby incorporated herein in its entirety by this reference thereto.

BACKGROUND OF THE INVENTION

1. Field of the Invention

The invention relates generally to electronic logic circuitry and, more particularly, to a device and method for detecting digital data and prioritizing that data in connection with cache memory operation in computers.

2. Description of the Related Art

An electronic logic circuit is a network of electrical connections and logic elements that performs one or more specified logical functions. Electronic logic circuits may perform a variety of operations and serve in diverse applications. Logic circuits may operate according to digital or analog principles depending upon design. In the presently available digital computers, numerous and varied logic circuitry is employed in central processing units and other hardware to accomplish desired manipulation of digital data. One particular application for electronic logic circuitry in a digital computer may be in manipulating and performing operations with data stored in memory, for example, data stored in cache memory, of the computer.

It may be desirable in certain digital electronic applications to, at times, observe a substantial number of stored data locations, or "cells". In those applications, it may also be desirable to perform one or more tasks based on the status of the cells observed, for example, depending on which cells, if any, have been modified. When it is detected that particular cells have been modified in those instances, it may be desired that more than one task (i.e., data manipulation operation) be performed. It is also possible in those applications that the tasks, and sequences thereof, be conducted in a particular instance as dictated by the particular cells (or statuses thereof, such as whether modified or unmodified) that are observed.

In the situation where a substantially large number of memory data cells must be observed and a sequence of multiple tasks performed as dictated by the particular cells, the prior electronic logic circuitry has typically operated by observing each individual cell of the large number of cells in a stepped manner. In that operation, a first cell is observed, then a task may be performed based on that observation. After the task relative to the first cell is performed, a next cell is observed and, if appropriate according to design, a task then performed based on that next cell. This stepped observation of cells has then been repeated in the prior art devices until all cells of the large number of cells have been observed and appropriate tasks dictated thereby performed.

As may be understood, this stepped observance of each cell of a large number of memory cells followed by a task may take significant processing time. A device and method which circumvents this stepped approach of the prior art would clearly be an improvement in the art. The present invention provides just such an improvement. One application for the invention, as hereafter described, is in memory storage operations in digital computers. In particular, the invention is particularly suited to those digital computers having a cache memory, as also hereafter described.

Today's computers and other digital processing devices often employ cache memories. A cache memory is typically considered a temporary memory, that is, a memory that is utilized only for temporary storage of data. Cache memories may store data temporarily for a variety of purposes, including to make data that is often needed readily available to circuitry that manipulates the data. By making such data so available to circuitry, fetch and store times for circuitry operation may be speeded. Cache memory is thus thought of as fast memory used in devices to optimize speed and performance.

In many applications, cache memories serve to speed the average memory access time of devices, such as digital computers, which require significant amounts of memory storage. Because significant memory storage is required by those devices, memory must be employed that is not closely associated with a processor or other logic circuitry. This memory is referred to as "external" memory because it is located off the device containing the logic circuitry and so must be accessed by system buses when data from that memory is to be manipulated or otherwise used by the logic circuitry. In these instances where external memory is necessary, the time required for logic circuitry to access the memory through system buses may be significant, resulting in slow operation of the device. Cache memories may be employed with these devices in many instances to speed operation of the devices.

As mentioned, cache memory is typically temporary memory. Because temporary, cache memory often is not quite so large as external memory in terms of number of memory cells. Because not so large as external memory, cache memory may be associated relatively closely with logic circuitry. This close association and smaller size of cache memory allows for easier and faster access of cache memory than of external memory. Cache memory, however, generally will not store as much data as external memory because of the smaller size of cache memory. Nevertheless, it is desirable for logic circuitry to be able to use data stored in the larger external memory. Cache memory may be employed in many instances to store desired information from external memory, thus, allowing logic circuitry to access cache memory to thereby obtain data (albeit indirectly) from external memory.

As may be anticipated, many factors impact the storage and access effectiveness of cache memory, for example, cache size, cache physical organization, cache line replacement/modification algorithms, and the behavior of any software being run which employs the cache memory. In typical operation of a cache memory, the cache memory maintains a copy of the most recently used code or data retrieved from the external memory. This code or data held in cache memory is what is used by the logic circuitry in its iterative operations. In devices utilizing cache memory, external memory has typically been employed only for permanent (or extended) data storage and is typically not accessed directly by the logic circuitry. Rather, the logic circuitry accesses cache memory, which cache memory holds data retrieved from external memory and then temporarily stored in cache for manipulation by the logic circuitry.

Because the logic circuitry of these devices manipulates data held in cache memory rather than data retrieved directly from external memory, it is important that cache memory hold, from time to time, appropriate data from the external memory for logic circuitry operation and that external memory hold, from time to time, appropriate data then held in cache memory. Though data for manipulation may be stored in cache memory, the data must at times nevertheless correctly reflect the desired permanent (or extended) storage data then held in external memory. Therefore, data stored in cache memory, though temporary and almost continuously changing, must from time to time be identical to appropriate data then stored in external memory. Because cache memory must so reflect appropriate data held in external memory, and vice versa, old data held in cache memory must frequently be replaced with appropriate new data from external memory and old data held in external memory must frequently be replaced with appropriate new data from cache memory.

There are a number of known procedures and devices for replacing old data in external memory with appropriate new data from cache memory. In those procedures and devices, it is generally the case that a determination is made that data in cache memory has been modified, then those modifications are written to external memory. These procedures, and their effectiveness, for replacing old data with new data are generally dependent upon cache organization and the other factors previously described with respect to cache effectiveness.

Regardless of organization and other factors, however, prior procedures for determining modifications of cache and writing cache modifications to external memory have required a stepped check, as previously described herein, through each location of stored information in the cache to determine at each location whether there has been any modification of cached data. Only when a modification is found in that stepped check is the external memory updated. Because cache memory is being replaced continually during the operation of associated logic circuitry, these prior procedures of stepping through every piece of information stored in the cache until a modification is found are time consuming relative to logic circuit operations. It would, therefore, be an advantage over the prior art if new devices and procedures were developed for identifying modifications of cache and updating external memory to reflect those modifications, which devices and procedures would allow reduced cache memory operation times.

In discussion of cache memories as they may relate to the priority lookahead encoder invention described herein, a number of particular terms are often used. For a better understanding of the objects and advantages of the present invention, definitions are provided here for certain of those terms as follows:

Associativity—a number which refers to the number of possible locations in the cache based on cache organization in which a specific address may be cached. It also refers to the number of tags which are read and compared concurrently.

Clean line—a cache line that is not marked as modified because it is not written to main memory in a copyback write policy. The fact that such a cache line is not marked as modified indicates that the line is not modified relative to the relevant main memory.

Copyback—a write policy in which a write-back is performed in the cache when data is modified within the cache. When cached data is modified, the cache is flushed. When flushed, the data in the line or lines of the cache then marked as modified is written (copied back) to the main memory.

Data array—a random access memory array that contains the data variables for use by a processor.

Data cache—a cache which is used for caching frequently used processor data variables.

Index—each cache line has an index associated with it that must be stored and compared against the index of the memory request. Indexes are kept as entries (one per line) in a directory that establishes the correspondence between the data in the cache and the particular fragment of main memory that is represented.

Line (or Block)—a cache line or block is a group of sequential words in cache memory associated with a tag.

Look-up—a look-up is performed when some data is pulled from the main memory and placed in the cache.

Modified line—a cache line is marked as modified when it is written in a copyback write policy. The mark indicates that the line contains the most recent version of the data.

Status Bits—a status bit is associated with each cache line and indicates the modified or unmodified status of the line.

Tag—the tag identifies the address of the data or instruction which is currently present in the cache. A cache tag is associated with each cache line and is stored in the tag array.

Tag array—a random access memory array that contains the address tags for cache data.

The present invention in a preferred embodiment is a priority lookahead encoder with associativity determination logic. The priority lookahead encoder may have varied application, such as in any instance where observance of a significantly large amount of data is required and where multiple tasks may be necessary in response to the data observed. A particularly useful application of the invention, however, is in digital computers having cache memory. As will be more fully discussed herein, the present invention provides a speeded mechanism and procedure for simultaneously observing large amounts of data and performing tasks dictated by the data. The invention provides these advantages because it prioritizes the performance of tasks dictated by observed data, therefore, allowing for substantially simultaneous observance of large amounts of data. Thus, the invention is a significant improvement in the art.

SUMMARY OF THE INVENTION

One embodiment of the invention is a device for simultaneously detecting more than one condition, where each condition corresponds to a specific memory cell of an array of more than one memory cell, each specific memory cell of the array has a distinct index given by a first number of bits and a distinct associativity given by a second number of bits, each condition triggers a particular, distinct task, and each task, if more than one, is prioritized. The device comprises more than one input signal, each said input signal being relative to and indicative of the condition for one said specific memory cell, circuitry for simultaneously receiving each said more than one input signal and logically determining the distinct associativity and the distinct index for each said specific memory cell and prioritizing each said task dictated by each said condition indicated by each said input with respect to each other said task dictated by each other said condition indicated by each other said input, and output signals for sequentially outputting each said distinct associativity and said distinct index for each specific memory cell in the order of prioritization of each said task.

In another aspect, the circuitry includes a first NOR gate, the first NOR gate receiving each said more than one input signals and outputting as a first gate output signal any of the input signals indicative that the condition is modified condition, a second NOR gate, the second NOR gate receiving an enable signal and the first gate output signal from the first NOR gate, if any, the second NOR gate outputting an index enable signal of enable if the enable signal or the first gate output signal indicates that the condition is modified condition, index transistors, each having a first gate, a first drain and a first source, the index transistors corresponding in number to each of the first number of bits, the index transistors being commonly electrically connected by the first gate of each of the index transistors and being commonly electrically connected by the first drain of each of the index transistors, each said first gate of each of the index transistors being electrically connected with the index enable signal, the index transistors being enabled if the index enable signal indicates that the condition is modified condition, associativity transistors, each having a second gate, a second drain and a second source, the associativity transistors corresponding in number to each of the second number of bits, the associativity transistors being commonly electrically connected by the second gate of each of the associativity transistors and being commonly electrically connected by the second drain of each of the associativity transistors, and a transistor, having a third gate, a third drain, and a third source, for enabling the associativity transistors if the index transistors are enabled, the transistor being electrically connected by the third gate with the index enable signal and by the third drain with each said first drain of the index transistors. Each of the first source of the index transistors outputs bits as the output signals indicative of the distinct index if the index transistors are enabled and each said second source of the associativity transistors outputs bits as the output signal indicative of the distinct associativity if the index transistors and the associativity transistors, via the transistor, are each enabled.

In yet another aspect, the device is employed with a cache memory of a digital computer to speed external memory write procedures.

Another embodiment of the invention is a method for simultaneously detecting more than one condition, each said condition corresponding to a specific memory cell of an array of more than one memory cell, each said specific memory cell of the array having a distinct index given by a first number of bits and a distinct associativity given by a second number of bits, each said condition triggering a particular, distinct task, and prioritizing each said task, if more than one. The method includes the steps of inputting more than one input signal, each said input signal being relative to and indicative of said condition for one said specific memory cell, simultaneously receiving each said more than one input signal, logically determining the distinct associativity and the distinct index for each said specific memory cell, prioritizing each said task dictated by each said condition indicated by each said input with respect to each other said task dictated by each other said condition indicated by each other said input, and sequentially outputting each said distinct associativity and said distinct index for each specific memory cell in the order of prioritization of each said task.

In another aspect, the step of receiving of the method includes the steps of receiving each said more than one input signals; the step of logically determining includes the steps of outputting as a first gate output signal any of the input signals indicative that the condition is modified condition, receiving an enable signal and the first gate output signal, if any, and outputting an index enable signal of enable if the enable signal or the first gate output signal indicates that the condition is modified condition. The step of prioritizing includes the steps of enabling index transistors, each having a first gate, a first drain and a first source, the index transistors corresponding in number to each of the first number of bits, the index transistors being commonly electrically connected by the first gate of each of the index transistors and being commonly electrically connected by the first drain of each of the index transistors, each said first gate of each of the index transistors being electrically connected with the index enable signal, the index transistors being enabled if the index enable signal indicates that the condition is modified condition; enabling associativity transistors, each having a second gate, a second drain and a second source, the associativity transistors corresponding in number to each of the second number of bits, the associativity transistors being commonly electrically connected by the second gate of each of the associativity transistors and being commonly electrically connected by the second drain of each of the associativity transistors; enabling a transistor, having a third gate, a third drain, and a third source, if the index transistors are enabled by the step of enabling the index transistors, the transistor being electrically connected by the third gate with the index enable signal and by the third drain with each the first drain of said index transistors; outputting as said output signals bits indicative of the distinct index if the index transistors are enabled by the step of enabling the index transistors; and outputting bits as the output signal indicative of the distinct associativity if the index transistors and the associativity transistors, via the transistor, are each enabled.

In another aspect, the method is employed with a cache memory of a digital computer to speed external memory write procedures.

Yet another embodiment of the invention is an encoder. The encoder comprises a level one logic block, the level one logic block simultaneously receiving inputs indicative of locations and conditions of each of a number of observed memory cells, the conditions for each of the number of observed memory cells being either modified or unmodified, a level two logic block, the level two logic block receiving enabling output signals of the level one logic block, the enabling output signals indicative of any of the inputs to the level one logic block indicating a modified condition, the enabling output signals serving to enable the level two logic block, and a level three logic block, the level three logic block being enabled by receipt of an enabling signal output by the level two logic block when the level two logic block is enabled; wherein the encoder, for each of the inputs indicative of the modified condition, outputs a distinct index address and a distinct associativity address, the outputs being prioritized.

Even another embodiment of the invention is a method for determining an index address and an associativity address of a modified memory cell in a cache memory of a digital computer. The method comprises the steps of observing simultaneously several of the memory cells, detecting whether any of the memory cells are modified, outputting the index address and the associativity address corresponding to each of the memory cells that is modified, and prioritizing the steps of outputting, if more than one, so that only a single one of the index address and the associativity address corresponding to the modified memory cell is output at any time.

Another embodiment of the invention is a device for determining an index address and an associativity address of a modified memory cell in a cache memory of a digital computer. The device comprises circuitry for observing simultaneously several of the memory cells, circuitry for detecting whether any of the memory cells are modified, circuitry for outputting the index address and the associativity address corresponding to each of the memory cells that is modified, and circuitry for prioritizing the steps of outputting, if more than one, so that only a single one of the index address and the associativity address corresponding to the modified memory cell is output at any time.

A further embodiment of the invention is a method for determining an index and an associativity of a modified memory cell of an array of memory cells. The method comprises the steps of detecting signals indicative of a modified or unmodified status of each of several memory cells of the array of memory cells, determining whether any of the signals detected indicates one or more of the several memory cells is modified, determining an index of each of the modified memory cells, determining an associativity of each of the modified memory cells, logically choosing any of the signals indicative of the one or more of the modified memory cells for each of the determining steps, and logically enabling any of the signals indicative of the one or more of the modified memory cells for each of the determining steps.

An additional embodiment of the invention is a device for determining an index and an associativity of a modified memory cell of an array of memory cells. The device comprises circuitry for detecting signals indicative of a modified or unmodified status of each of several memory cells of the array of memory cells, circuitry for determining whether any of the signals detected indicates one or more of the several memory cells is modified, circuitry for determining an index of each of the modified memory cells, circuitry for determining an associativity of each of the modified memory cells, circuitry for logically choosing any of the signals indicative of the one or more of the modified memory cells for each of the determining steps, and circuitry for logically enabling any of the signals indicative of the one or more of the modified memory cells for each of the determining steps.

BRIEF DESCRIPTION OF THE DRAWINGS

For a more detailed understanding of the present invention and for further objects and advantages thereof, reference may now be had to the following description taken in conjunction with the accompanying drawings, in which.

DETAILED DESCRIPTION OF THE INVENTION

Figures 1, 2:
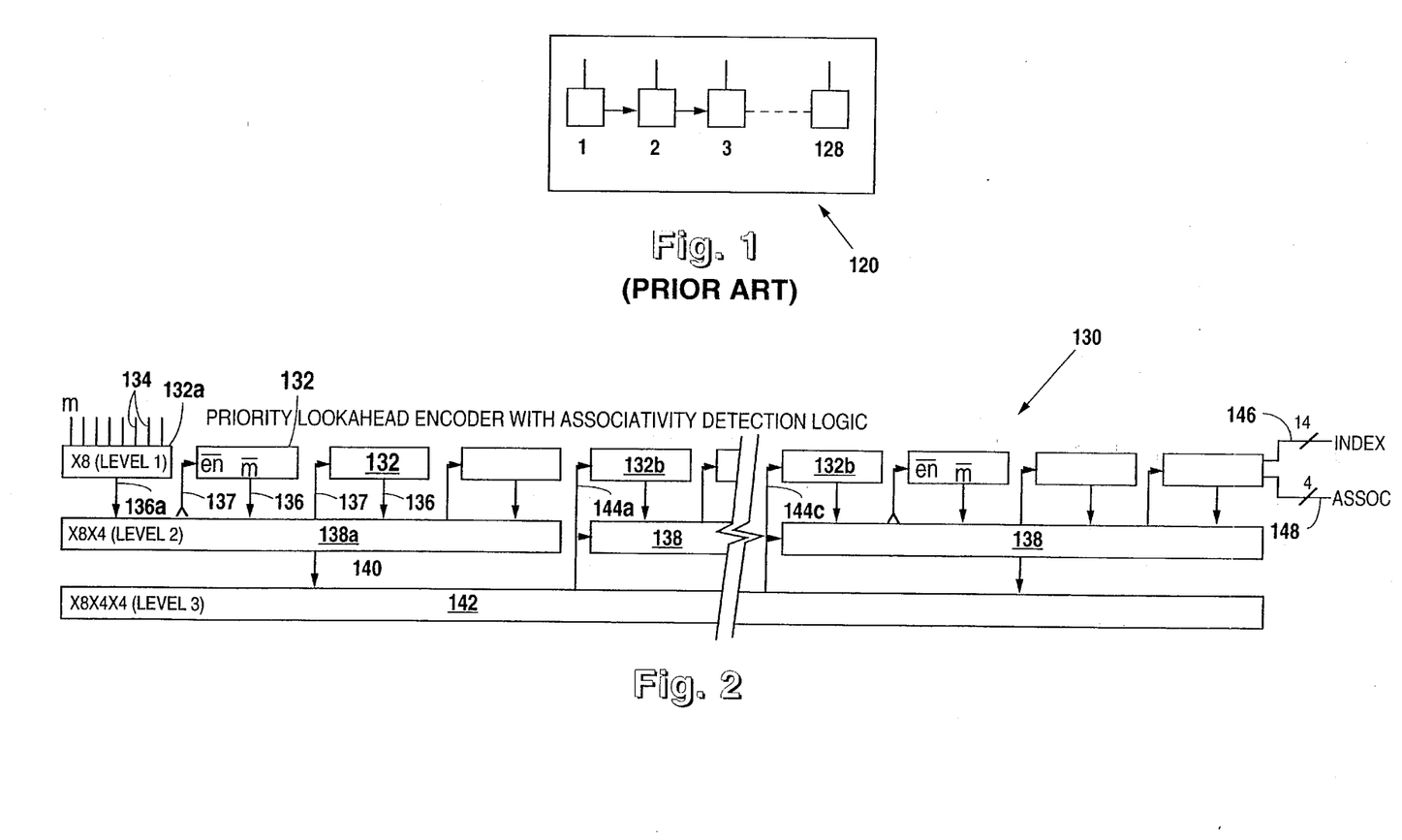
FIG. 1 is a simplified, block illustration of a prior art data detection scheme.
FIG. 2 is a simplified, block illustration of the priority lookahead encoder with associativity determination logic of the present invention, which invention allows for simultaneous observance of large amounts of data and prioritization of tasks dictated by the observed data.

Referring first to FIG. 1, a prior art data detection scheme 120 is illustrated. In this data detection scheme 120, a large amount of data, for example, 128 cells of data each in arrays, as illustrated in FIG. 1, is observed. The data observance may be performed for a variety of reasons, such as to determine the modified or unmodified status of each of the 128 cells of each of the four arrays or for other reasons. As is illustrated, this prior detection scheme 120 observes, in a step-by-step manner, each individual cell. The detection scheme begins by observing cell 1 of a first of the four arrays. Depending upon the status of cell 1 that is detected, a task may or may not then be performed.

Continuing to refer to FIG. 1, after cell 1 is observed and any appropriate task performed in response to the observance, the next cell, cell 2, is observed. Again, depending upon the status of cell 2 that is observed, a task may or may not be performed. After cell 2, the detection scheme 120 continues in the same manner to sequentially observe each of the next cells of the 128 cells and perform any task dictated by each such cell. As is apparent, this sequential detection scheme 120 of the prior art may require significant time, in terms of electronic digital circuit speed, since each cell must be individually observed and any task performed in response to the observance. In every instance in which the entire 128 cells of data is observed, this sequential detection followed by task must occur.

Referring now to FIG. 2, the priority lookahead encoder 130 of the present invention is simply illustrated in block form. The priority lookahead encoder 130 allows for simultaneous observance of a larger amount of data at each step, for example, 32 cells at a time of 512 cells of data arranged in four arrays of 128 cells each. When a larger amount of data is simultaneously observed, any tasks required in response to the detected cells are prioritized by the priority lookahead encoder 130. Because the greater amounts of data may be simultaneously observed and any tasks in response are prioritized for performance thereafter, the priority lookahead encoder 130 provides a speedier detection scheme than that of the prior art stepped detection scheme 120 (shown in FIG. 1). Although 512 cells of memory arranged in four arrays of 128 cells each is described herein in connection with operation of the priority lookahead encoder 130, it should be understood that this number of cells and its arrangement are intended only as exemplary. Likewise, the number of cells simultaneously observed by the priority lookahead encoder 130, as hereinafter more particularly discussed, may vary according to design in keeping with the principles of the invention set forth herein.

Still referring to FIG. 2, operation of the priority lookahead encoder 130 of the present invention may be described. The priority lookahead encoder 130 illustrated is comprised of three levels, Level 1, Level 2, and Level 3. This three level arrangement of the priority lookahead encoder 130 is appropriate for the exemplary application of a 512 cell memory, arranged as four arrays of 128 cells each. Level 1 of the encoder 130 includes sixteen Level 1 functional blocks 132. A first of the Level 1 functional blocks 132a may receive inputs 134 indicative of status (or other condition) of 32 memory cells. Although only eight inputs 134 are shown entering Level 1 functional block 132a, it is understood that each line represents four inputs 134 to equal the 32 inputs 134. Furthermore, it is understood that there are 32 inputs 134 for each Level 1 functional block 132 to total 512 inputs 134. As will hereinafter be more fully discussed, if the priority lookahead encoder 130 is employed in a cache memory application, each of the inputs 134 is a status bit relevant to a particular memory cell of the cache memory.

Further referring to FIG. 2, that first Level 1 functional block 132a receives the 32 inputs 134 and performs a logical operation, as hereinafter more fully described, and passes a single Level 1 output signal 136a to a first Level 2 functional block 138a, which is one of four Level 2 functional blocks 138. Each of the Level 2 functional blocks 138 outputs three enable signals 137 that pass to the Level 1 functional blocks 132. Each Level 2 functional block 138 also receives four Level 1 output signals 136, i.e., one signal 136 from each of four Level 1 functional blocks 132 (and, in the case of the first Level 2 functional block 138a, one of the signals 136 is the signal 136a). The Level 2 functional blocks 138 each perform logical operations with the four Level 1 output signals 136 received.

Still referring to FIG. 2, it is of note that for each of the second through fourth set of four Level 1 functional blocks 132 a first Level 1 functional block 132b of each group of four Level 1 functional blocks 132 receives an input signal 144a, 144b (not shown), or 144c from a single Level 3 functional block 142. Further, it is of note that each of the Level 2 functional blocks 138 (other than the first of the Level 2 functional blocks 138a) also receives that input 144a, 144b (not shown), or 144c. Each Level 2 functional block 138 outputs a single Level 2 output signal 140. The Level 2 output signals 140, a total of four because of the four Level 2 functional blocks 138, are input to a single Level 3 functional block 142. The last Level 1 functional block 132b outputs two signals, a fourteen bit (i.e., seven true and seven complement) index address signal 146 and a four bit associativity address signal 148.

Further referring to FIG. 2, the operational concept of the priority lookahead encoder 130 may be described. The encoder 130 identifies in groups of 32 a status of memory cells, for example, based on a status bit of each of the cells. The status bit of each memory cell of the group of 32 cells is input 134 to the priority lookahead encoder 130 through the first of the Level 1 functional blocks 132a. If the first block 132a determines that any of the inputs 134 indicates a particular memory cell condition, such as a modification of the data stored in the memory cell, the first block 132a signals via 136a to the first Level 2 functional block 138a that there is a modification. The first Level 2 functional block 138a then signals via signal 140 to the Level 3 functional block 142 that there is a modification. The Level 3 block 142 and Level 2 blocks 138a, 138 each signal blocks in the higher levels, e.g. Level 2 signals Level 1, and Level 3 signals Level 2 and Level 1. These signals 144a, 144b (not shown), 144c, 137 indicate to the higher level blocks 138, 132 that a modification has been found. In this manner, and as more fully discussed in connection with FIGS. 3–6, the encoder 130 detects memory cell status and prioritizes the result when particular statuses, such as modifications, are simultaneously detected in the observation of 32 memory cells.

Figure 3:
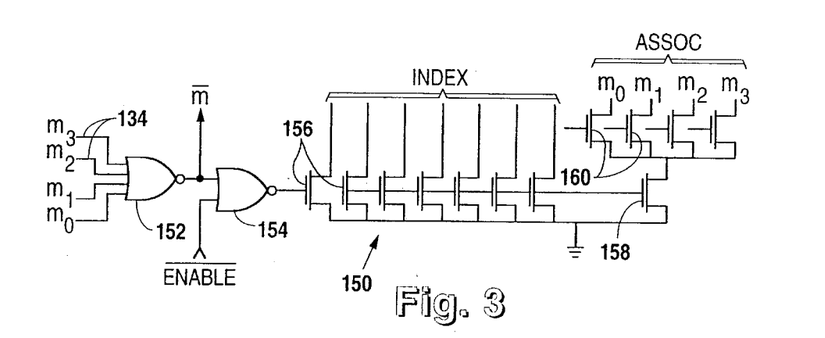
FIG. 3 is a detailed, schematic illustration of the circuit which serves as a fundamental building block of the priority lookahead encoder of FIG. 2.

Now referring to FIG. 3, a circuit that is the fundamental building block 150 of the priority lookahead encoder 130 is shown. In the block 150, the signals $m_0$, $m_1$, $m_2$, and $m_3$ 134 represent the status of memory cells of an associativity of a multi-layer array, for example, a four way associative array of 512 memory cells. The block 150 includes a first NOR gate 152 which serves to assert (denoted by m bar) if any of signals $m_0$, $m_1$, $m_2$, or $m_3$ 134 indicate a modification. has been modified. A second NOR gate 154 serves to turn on transistors 156 when enabled (denoted by ENABLE bar). The transistors 156 give an index address. The enable signal comes from the previous building block circuit 150 in the form of signal m bar (of the particular sequence of blocks as shown in FIG. 4), from enable signals 137 or input signals 144a, 144b or 144c, as the case may be, when that previous block or cell indicates a modified status.

Continuing to refer to FIG. 3, as those skilled in the art will appreciate, the transistors 156 represent precharge, discharge lines. Though not shown in FIG. 3 in detail, the block 150 will comprise additional precharge circuitry. The precharge circuitry is set up so that only the (Level 1) will have precharges. There is a single precharge on each of the fourteen lines (only the seven true lines are shown, the seven complement lines are not shown) of the index address and on each of the four lines of the associativity address. If any of signals $m_0$, $m_1$, $m_2$, or $m_3$ 134 is asserted in the block 150, transistors 156 will discharge an address (i.e., location) that corresponds to the signal. It is understood that the transistors 156 shown in FIG. 3 would output a "true" index address of "0000000", transistors 156 would be appropriately configured to generate the corresponding index address for each set of signals m0–m3 134. Further, the assertion enables certain associativity detection logic of the encoder 130, turned on by transistor 158, to give modified bits $m_0$, $m_1$, $m_2$, and/or $m_3$ from transistors 160, which modified bits are the same as the input signals $m_0$, $m_1$, $m_2$, and $m_3$ to the block 150. The associativity detection, then, is performed by the block 150 by looking at the modified bits and discharging the corresponding associativity line that has been modified. In sum, the block 150 gives an index when a signal indicating a particular memory cell status (such as modified) is input and then an associativity related to the cell, but does not give any index or associativity if the input signals do not indicate such a particular memory cell status (such as modified).

Figure 4:
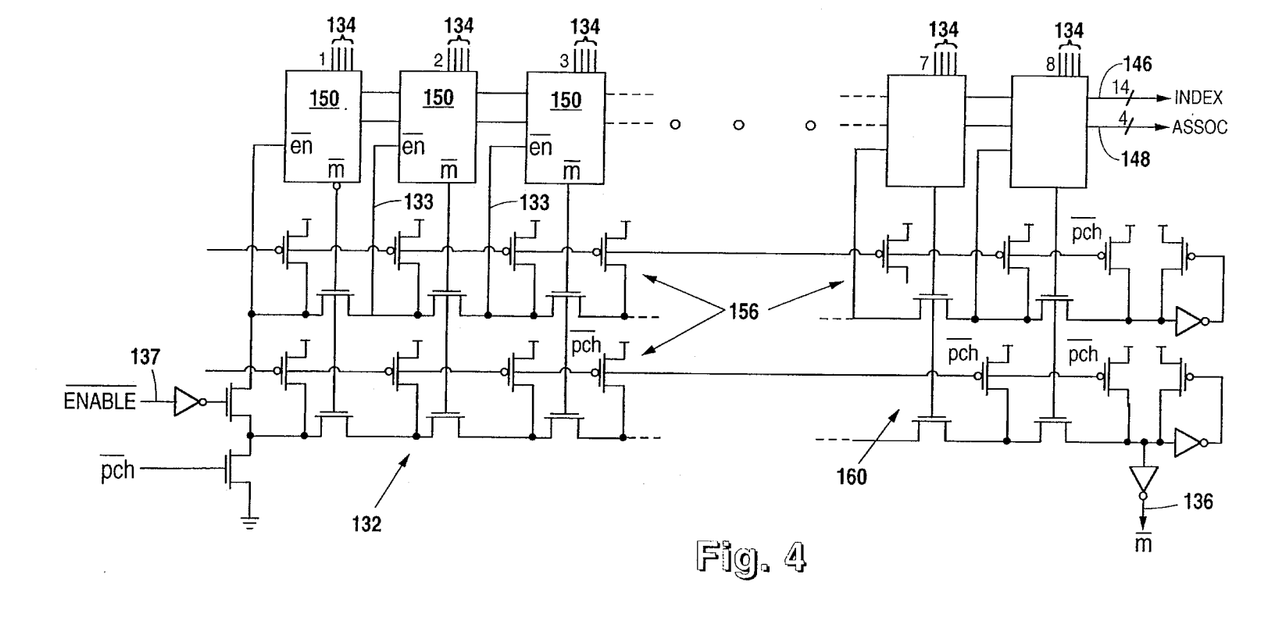
FIG. 4 is a detailed, schematic illustration of the blocks identified as Level 1 of the priority lookahead encoder of FIG. 2.

Now referring to FIG. 4, a detail of the Level 1 functional block 132 is shown. The Level 1 functional block 132 receives inputs 134 related to a condition of 32 memory cells of an array of memory cells, for example, 512 memory cells arranged in four way associative arrays of 128 cells each, and corresponding enable signals 133. The Level 1 functional block 132 also receives an input of an enable signal 137 received from a Level 2 functional block 138 (as shown in FIG. 1). A Level 1 output signal 136 is passed to a Level 2 functional block 138 (also as shown in FIG. 1).

Still referring to FIG. 4, as previously described in connection with the discussion of the fundamental building block circuit 150, each building block circuit 150 will communicate via an enable signal 133 with a set of seven transistors 156 that function to give a related index address when the signal 134 indicates a particular cell status, such as a modification. If a related index address is given with respect to a particular memory cell because that cell has the particular status, then a set of four transistors 160 function to yield an associativity address. In operation of the Level 1 functional block 132, if a memory cell has the particular status (e.g., that the cell has been modified), the m signal for that cell will turn off (i.e., it is actually a "disable" communication in this instance) the subsequent corresponding group of seven transistors 156 to which the signal 133 passes. Thus, the encoder 130 circuitry following that group of seven transistors 156 will not be enabled for the next successive memory cells.

Figure 5:
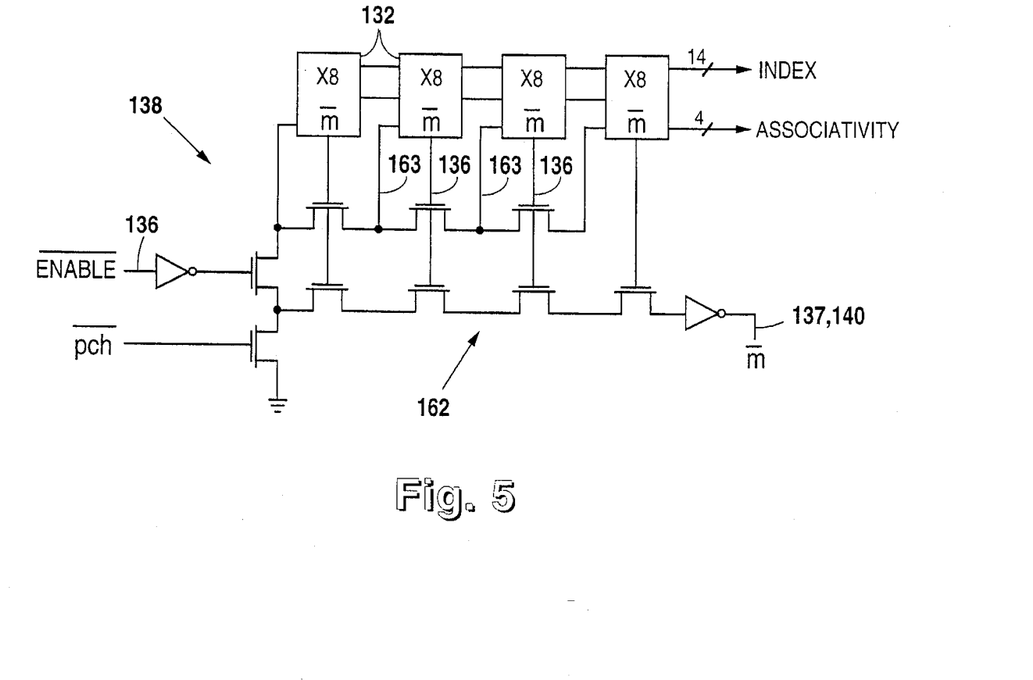
FIG. 5 is a detailed, schematic illustration of the blocks identified as Level 2 of the priority lookahead encoder of FIG. 2.

Further still referring to FIG. 4, if no modification is detected in any of the eight building block circuits 150 observed by the Level 1 functional block 132, the block 132 outputs a Level 1 output signal 136 which indicates to the Level 2 functional block 138 (shown in FIGS. 2 and 5) that there is no modification. On the other hand, if there is a modification detected at Level 1, the Level 1 output signal 136 notifies the Level 2 functional block 138 of the modification. Referring to FIG. 5, the Level 1 functional blocks 132 are illustrated as boxes in this detail of a Level 2 functional block 138. The Level 2 functional blocks 138 function in substantially the same manner as each of the Level 1 functional blocks 132. There are seven transistors 162 that are enabled or disabled by enable signals 163 depending upon the signal 136 passed from Level 1 to Level 2 indicating modified or unmodified with respect to the observed memory cells.

Figure 6:
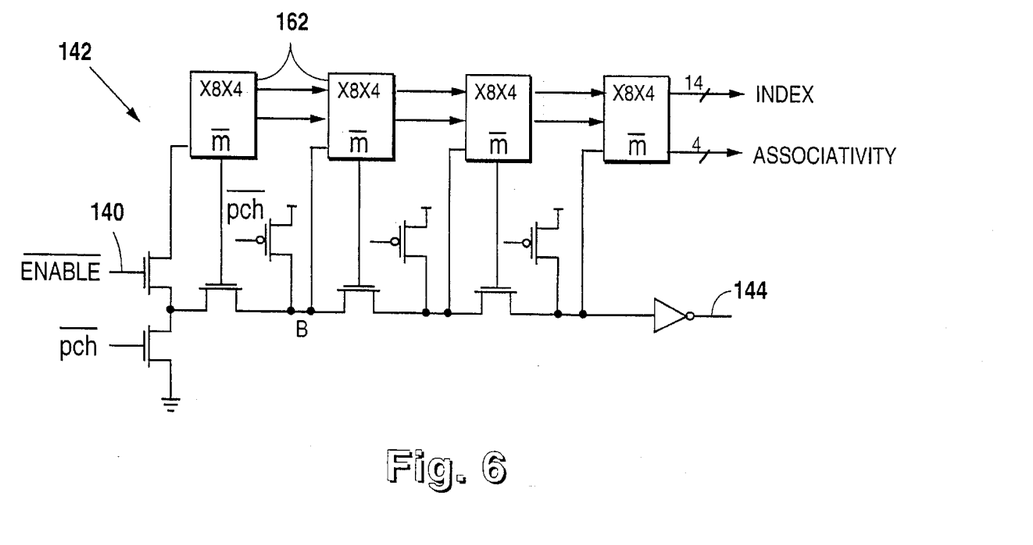
FIG. 6 is a detailed, schematic illustration of the blocks identified as Level 3 of the priority lookahead encoder of FIG. 2.

Now referring to FIG. 6, a detail of a Level 3 functional block 142 is shown. Again, this Level 3 functional block 142 is organized according to the same principles previously described in connection with the Level 1 and Level 2 blocks 132, 138. As previously described, the Level 3 functional block 142 is the last level. The Level 3 functional block 142 passes the modified/unmodified signal 144 to the Level 1 and Level 2 functional blocks 132, 138. The outputs then from the priority lookahead encoder 130 are the index address (fourteen line; seven bits of data plus complement) and the associativity address (four line) for a modified memory cell.

Figure 7:
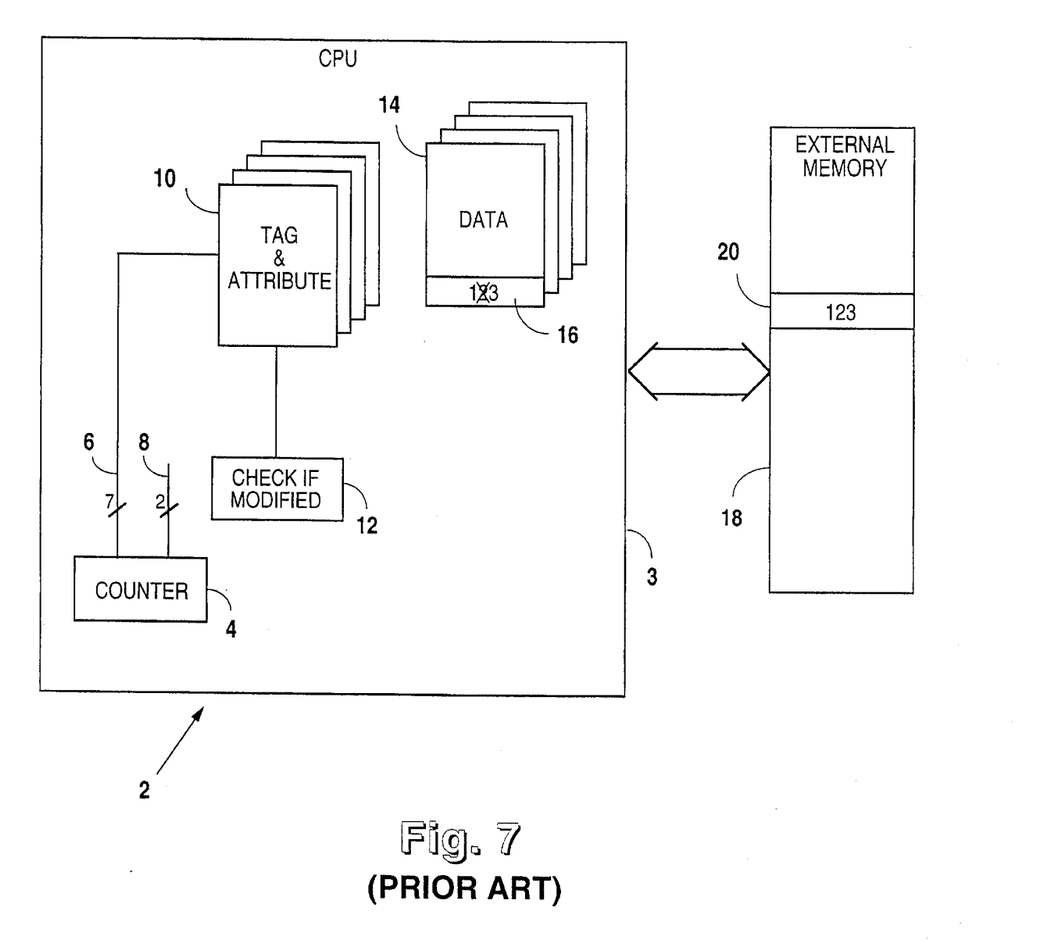
FIG. 7 is a simplified, block illustration of a prior art cache accessing and copyback process and apparatus, employing the prior art data detection scheme illustrated in FIG. 1.
Figure 8:
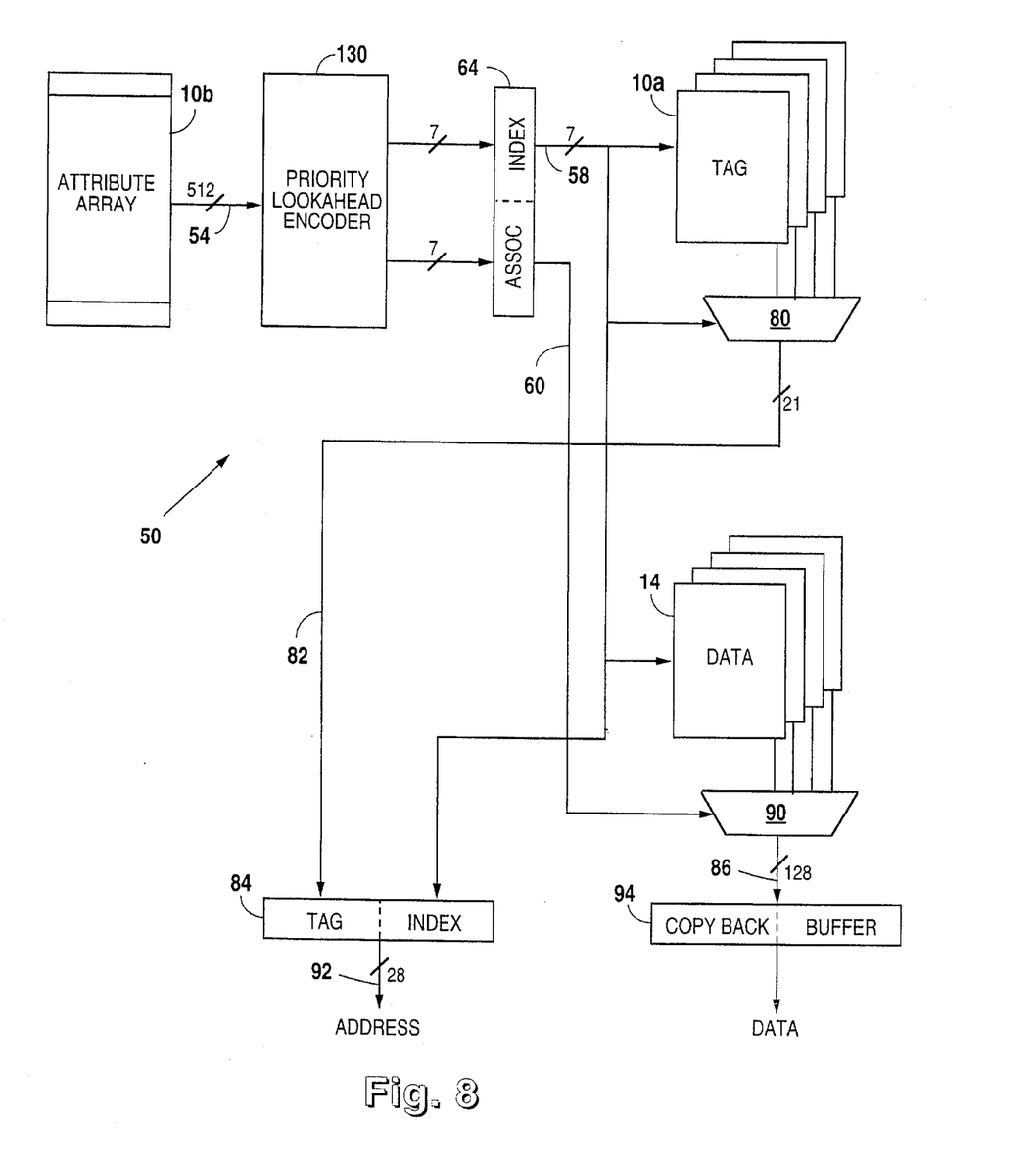
FIG. 8 is a simplified, block illustration of the priority lookahead encoder of the present invention shown in FIGS. 2–6, as used in connection with a cache memory and external memory to determine the addresses of modified lines in a cache memory and execute a prioritized copyback routine based on the modifications detected.

Now referring to FIGS. 7 and 8, an exemplary application of the priority lookahead encoder 130 in connection with a cache memory of a digital computer is described. In FIG. 7, a prior art cache memory addressing and copyback apparatus 2 is illustrated. This prior apparatus 2 consists of a central processing unit ("CPU") 3 and certain external memory 18. The CPU 3 comprises a data array 14 and a tag and attribute array 10.

Still referring to FIG. 7, the data array 14 of this prior art cache memory apparatus 2 contains a number of memory locations, for example, 512 if a four-layer array each having 128 lines of cache data. Such a data array 14 is typically employed in this arrangement for storing processor data variables frequently used by the CPU 3 of the device during iterative operations. The data array 14 holds the variable values for ready access and manipulation by the CPU 3.

Continuing to refer to FIG. 7, the tag and attribute array 10 is a cache which is used for storing identifying data relevant to the addressing of information stored in the data cache 14. The particular identifying data stored in the tag and attribute array 10 can be of a variety of forms depending upon the particular type of addressing technique employed with the cache memory 2. In a typical type of addressing technique, the tag and attribute array 10 contains an indicator of status of data at each particular location in the data array 14 (i.e., whether modified or unmodified) and a respective location address for that data in the data array 14.

Still continuing to refer to FIG. 7, the CPU 3 also includes a counter 4 mechanism. The counter 4 serves to step processing through each of the address tags stored in the tag and attribute array 10 when accessing data of the data array 14. The counter signal 6 directs the check if modified mechanism 12 to look at a particular line of the tag and attribute array 10. The point signal 8 directs the counter 4 to point, respectively, to each of the four layers of the tag and attribute array 10 so that the counter signal 6 may cause the check if modified mechanism 12 to check each line of each of the layers. The check if modified mechanism 12 of the CPU 3 serves to check for a modification in each location of the tag and attribute array 10 as the counter 4 steps through those locations.

Still referring to FIG. 7, operation of the prior art cache memory addressing and copyback apparatus 2 may be understood. For exemplary purposes, consider that each of the tag and attribute array 10 and the data array 14 are four layer and have 128 lines per layer. The counter signal 6, is then, for example, a 7-bit signal, which corresponds to the 128 locations of each layer of the tag and attribute array 10. The point signal 8 may be, for example, a 2-bit signal, which causes the check if modified mechanism 12 to look at a particular one of the four layers while the counter signal 6 causes the check if modified mechanism 12 to step through each line of that layer. Once all locations of a particular layer are checked for modification, the point signal 8 causes the check if modified mechanism 12 to look at the next successive layer, and so on until a modification is found or, if no modification, then, until each location of the entire tag and attribute array 10 has been checked.

Further referring to FIG. 7, the counter 4, in this prior art apparatus 2, must step the check if modified mechanism 12 through each memory location of the tag and attribute array 10, one by one, and check each such location to determine whether the particular, relevant line of the tag and attribute array 10 has been modified. In this exemplary prior art apparatus 2 described herein, this may require the check if modified mechanism 12 to look-up and check up to 512 sequences each time cache memory is to be checked for a modification. Even if a modified line is found and an address determined and copyback routine exercised, the check if modified mechanism 12 must again be stepped through each memory location of the tag and attribute array 10 to determine the next or later modified line. As may be readily appreciated, stepping a check mechanism 12 through each of some 512 possible memory locations each time a modification must be determined is time consuming in terms of processor speed. The speed of cache memory modification addressing and copyback becomes even more important as cache memory size increases in devices. It will be understood by those in the art that the arrays 10,14 described here are intended only as exemplary and that the problem addressed by the present invention is found in all cache memories.

Now referring to FIG. 8, a cache controller index address generator 50, including the priority lookahead encoder 130 of the present invention, is illustrated. As will be hereinafter more fully understood, this cache controller index address generator 50 speeds determination of the address of a modified line in a cache memory and retrieval of the tag address, data, and corresponding associativity of that line in order to execute a copyback routine for the modified cache line. In general concept, the generator 50 simultaneously looks at a specified bit of each line of the attribute array 10b indicative of status of the line (i.e., modified or unmodified) and provides a scheme to prioritize copyback of modified lines when more than one modified line is indicated.

Still referring to FIG. 8, like elements in FIGS. 1 and 2 are identified by the same numbers. As in the prior art cache memory addressing and copyback apparatus 2 of FIG. 7, the present cache controller index address generator 50 includes tag and attribute arrays 10a,10b (identified separately here in FIG. 8) and a data array 14. The cache controller index address generator 50 operates on those attribute and tag arrays 10b,10a to directly determine lines of the data array 14 which are modified and the tag, attribute, and corresponding associativity of those modified lines.

Continuing to refer to FIG. 8, a priority lookahead encoder 130 simultaneously checks a particular status of more than one line, e.g., eight lines, of the attribute array 10b. A status bit, as previously defined, is associated with each memory location or cache line and indicates the modified or unmodified field status of the location. If the status bit of any line (or lines) of the attribute array 10b indicates a modification of cached data, i.e., a modified line in the data array 14, then that signals the priority lookahead encoder 130 to prioritize modifications (if more than one) and cause the cache memory to perform copyback routines to write the modified data to external memory.

Further referring to FIG. 8, the priority lookahead encoder 130 is preferably a logic circuit as previously detailed. The encoder 130 simultaneously looks only at each status bit of several lines (e.g., eight) of the attribute array 10b. By looking at each status bit of each such line in that manner, the priority lookahead encoder 130 detects any modification(s) indicated by status bit(s). The priority lookahead encoder 130 logic circuitry also serves to prioritize the modifications detected, if more than one, for purposes of copyback to external memory. Though the description herein has primarily addressed a preferred priority lookahead encoder 130 mechanism, the mechanism may alternatively perform only certain of those functions, with other devices or mechanisms performing the functions not performed by the priority lookahead encoder 130. As another alternative, the priority lookahead encoder 130 could check status bits of more or less or all of the lines of the attribute array 10b, simultaneously; in that event, the priority lookahead encoder 130 could provide alternative or additional prioritizing arrangements since multiple determinations would be necessary for a single look at all cache locations for determining modifications. As will be apparent to those skilled in the art, additional, further, alternative and combinational modifications of the priority lookahead encoder 130 may be possible.

Still referring to FIG. 8, in the embodiment of the cache controller index address generator 50, the priority lookahead encoder 130, upon detecting one or more status bits of the attribute array 10b indicating modified lines of the data array 14, yields two signals: an associativity signal 60 and an index signal 58 indicative of the associativity and index, respectively, of a modified line of the data array given priority. It should be noted that the priority lookahead encoder 130 may simultaneously detect more than one status bit of the attribute array 10b indicating modification. This is the case when there is more than one modified line of the data array 14. In fact, there will at any point in time be one status bit indicating modification for each line of the data array 14 which is then modified. Because the priority lookahead encoder 130 may so simultaneously detect several status bits indicating modification, the generator 50 must, in some manner, prioritize the several modifications for purposes of performing copyback. As previously discussed, the priority lookahead encoder 130 of the cache controller index address generator 50 may perform that function. The associativity signal 60 and the index signal 58 will first correspond with the modification given first priority, will second correspond with the modification given second priority, and so on until the associativity signal 60 and index signal 58 corresponding to each modification detected in the modification check by the priority lookahead encoder 130 is passed from the priority lookahead encoder 130.

Continuing still to refer to FIG. 8, as each associativity signal 60 and index signal 58 relative to each particular modification detected is passed from the priority lookahead encoder 130, the signals 60,58 are stored in an associativity/index register 64. This associativity/index register 64 is a temporary data storage register which allows each successive associativity signal 60 and index signal 58 corresponding to modified lines of the data array 14 to be processed according to the priority established by the priority lookahead encoder 130.

Further referring to FIG. 8, the associativity signal 60 passes from the associativity/index register 64 to a first mux 80 and a second mux 90. The index signal 58, on the other hand, passes from the associativity/index register 64 to a tag array 10a and a tag/index register 84 for storage. The tag/index register 84 is a temporary data storage register which holds the index signal 58 during processing of a particular associativity signal 60 and index signal 58 from the priority lookahead encoder 130. The tag/index register 84 also holds a tag signal 82 which will hereinafter be discussed more fully.

Referring further to FIG. 8, the index signal 58 passed to the tag array 10a performs a look-up on all four layers of the tag array 10a to find the index in the tag array 10a indicated by the index signal 58. The particular associativity is then selected by the mux 80, which mux 80 receives the associativity signal 60 passed to the associativity/index register 64 by the priority lookahead encoder 130. In effect, the mux 80 receives the associativity signal 60 which indicates the desired associativity in order to select from the four indexes of the tag array 10a corresponding to the index signal 58 to the tag array 10a. The mux 80 selects from the memory locations of the four layers identified, and yields the tag signal 82. As previously mentioned, the tag/index register 84 stores the tag signal 82 and index signal 60.

Further, still referring to FIG. 8, the index signal 58 is likewise passed to the data array 14. That index signal 58 passed to the data array 14 performs a look-up on all four layers of the data array 14 to find the index in the data array 14 indicated by the index signal 58. The particular associativity is then selected by the mux 90, which mux 90 receives the associativity signal 60 passed to the associativity/index register 64 by the priority lookahead encoder 130. This process, like that in the first mux 80, is basically a cache data look-up which selects which way, i.e., which associativity, is to be sent out for direction to external memory. The mux 90 selects from the memory locations of the four layers identified, yielding a data signal 86. The data signal 86 is directed to a copyback buffer 94 for storage during performance of a copyback routine.

Referring still to FIG. 8, the tag/index register 84 makes available the address 92, indicative of the location in external memory at which particular data 86 then stored in the copyback buffer 94 is to be written. As described, the copyback buffer 94 stores the particular data 86 for performance of the copyback routine. In this manner, the generator 50 allows ready determination of modified cache memory lines and allows data from those modified lines to be written to external memory via some copyback routine. Clearly, the generator 50 and method thereof speed cache operation, eliminating the necessity of a stepped check through the cache for modifications.

Still referring to FIG. 8, operation of this cache controller index address generator 50 may be better understood by an example. For purposes of the example, consider that each of the attribute array 10b, the tag array 10a, and the data array 14 are four layer and have 128 lines per layer, that is, each array 10b,10a,14 is 512 kilobytes of memory. The priority lookahead encoder 130 simultaneously detects a single bit, i.e., the status bit, of each of several lines (e.g., eight) of one of the four layers and so detects 512 bits simultaneously (this is indicated in FIG. 8 by signal 54). Upon detecting one or more of the 512 status bits indicating modifications of lines of memory, the priority lookahead encoder 130 prioritizes the detected modifications, if more than one. The priority lookahead encoder 130 then successively, in the order prioritized, transmits a 7-bit index signal 58 and a 7-bit associativity signal 60 corresponding to the line in which each status bit indicating modification was found. Each of these 7-bit signals 58,60 are held in the associativity/index register 64. Additionally, the 7-bit associativity signal 60 is passed to the first mux 80 and the second mux 90 and the 7-bit index signal 58 is passed to the tag array 10a and the data array 14. A look-up is performed in each array 10a,10b to yield tag and data information, respectively, corresponding to the particular index signal 58. Each mux 80,90 selects, based on the associativity signal 60 inputs, a particular tag transmitted as a tag signal 82 and a particular data transmitted as a data signal 86. The tag signal 82 is 21-bits in this example. The data signal 86 is 128-bits in the example. The tag signal 82 and index signal 58 are combined in the tag/index register 84 to give a 28-bit address 92 for a copyback routine in writing the modification to external memory (not shown in FIG. 8). The data signal 86 is stored in the copyback buffer to give a 28-bit data for the copyback routine.

As is clearly seen, the present invention is a significant improvement in the art and provides substantial advantage over the prior art devices and methods. The present invention is believed to be especially effective when configured and employed as described herein, however, those skilled in the art will readily recognize that numerous variations and substitutions may be made in the device and method and their use and configuration to achieve substantially the same results as achieved by the embodiments and, in particular, the preferred embodiment expressly described herein. Each of those variations is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. A device for simultaneously detecting more than one condition, each said condition corresponding to a specific memory cell of an array of more than one memory cell, each said specific memory cell of said array having a distinct index given by a first number of bits and a distinct associativity given by a second number of bits, each said condition triggering a particular, distinct task, and prioritizing each said task, if more than one, comprising:

more than one input signal, each said input signal being relative to and indicative of said condition for one said specific memory cell;

circuitry for simultaneously receiving each said more than one input signal and logically determining said distinct associativity and said distinct index for each said specific memory cell and prioritizing each said task dictated by said condition indicated by each said input with respect to each other said task dictated by each other said condition indicated by each other said input; and output signals for sequentially outputting each said distinct associativity and said distinct index for each specific memory cell in the order of prioritization of each said task.

2. The device of claim 1, wherein said circuitry comprises:

first NOR gate, said first NOR gate receiving each said more than one input signals and outputting as a first gate output signal any of said input signals indicative that said condition is modified condition;

second NOR gate, said second NOR gate receiving an enable signal and said first gate output signal from said first NOR gate, if any, said second NOR gate outputting an index enable signal of enable if said enable signal or said first gate output signal indicates that said condition is modified condition;

index transistors, each having a first gate, a first drain and a first source, said index transistors corresponding in number to each of said first number of bits, said index transistors being commonly electrically connected by said first gate of each of said index transistors and being commonly electrically connected by said first drain of each of said index transistors, each said first gate of each of said index transistors being electrically connected with said index enable signal, said index transistors being enabled if said index enable signal indicates that said condition is modified condition;

associativity transistors, each having a second gate, a second drain and a second source, said associativity transistors corresponding in number to each of said second number of bits, said associativity transistors being commonly electrically connected by said second gate of each of said associativity transistors and being commonly electrically connected by said second drain of each of said associativity transistors; and a transistor, having a third gate, a third drain, and a third source, for enabling said associativity transistors if said index transistors are enabled, said transistor being electrically connected by said third gate with said index enable signal and by said third drain with each said first drain of said index transistors;

wherein each said first source of said index transistors outputs bits as said output signals indicative of said distinct index if said index transistors are enabled and each said second source of said associativity transistors outputs bits as said output signal indicative of said distinct associativity if said index transistors and said associativity transistors, via said transistor, are each enabled.

3. The device of claim 1, wherein the device is employed with a cache memory of a digital computer to speed external memory write procedures.

4. A method for simultaneously detecting more than one condition, each said condition corresponding to a specific memory cell of an array of more than one memory cell, each said specific memory cell of said array having a distinct index given by a first number of bits and a distinct associativity given by a second number of bits, each said condition triggering a particular, distinct task, and prioritizing each said task, if more than one, comprising the steps of:

inputting more than one input signal, each said input signal being relative to and indicative of said condition for one said specific memory cell;

simultaneously receiving each said more than one input signal;

logically determining said distinct associativity and said distinct index for each said specific memory cell;

prioritizing each said task dictated by each said condition indicated by each said input with respect to each other said task dictated by each other said condition indicated by each other said input; and sequentially outputting each said distinct associativity and said distinct index for each specific memory cell in the order of prioritization of each said task.

5. The method of claim 4, wherein said step of receiving includes the steps of:

receiving each said more than one input signals; wherein said step of logically determining includes the steps of:

outputting as a first gate output signal any of said input signals indicative that said condition is modified condition;

receiving an enable signal and said first gate output signal, if any;

outputting an index enable signal of enable if said enable signal or said first gate output signal indicates that said condition is modified condition; and wherein said step of prioritizing includes the steps of:

enabling index transistors, each having a first gate, a first drain and a first source, said index transistors corresponding in number to each of said first number of bits, said index transistors being commonly electrically connected by said first gate of each of said index transistors and being commonly electrically connected by said first drain of each of said index transistors, each said first gate of each of said index transistors being electrically connected with said index enable signal, said index transistors being enabled if said index enable signal indicates that said condition is modified condition;

enabling associativity transistors, each having a second gate, a second drain and a second source, said associativity transistors corresponding in number to each of said second number of bits, said associativity transistors being commonly electrically connected by said second gate of each of said associativity transistors and being commonly electrically connected by said second drain of each of said associativity transistors;

enabling a transistor, having a third gate, a third drain, and a third source, if said index transistors are enabled by said step of enabling said index transistors, said transistor being electrically connected by said third gate with said index enable signal and by said third drain with each said first drain of said index transistors;

outputting as said output signals bits indicative of said distinct index if said index transistors are enabled by said step of enabling said index transistors; and outputting bits as said output signal indicative of said distinct associativity if said index transistors and said associativity transistors, via said transistor, are each enabled.

6. The method of claim 4, wherein said method is employed with a cache memory of a digital computer to speed external memory write procedures.

7. An encoder, comprising:

level one logic block, said level one logic block simultaneously receiving inputs indicative of locations and conditions of each of a number of observed memory cells, said conditions for each of said number of observed memory cells being either modified or unmodified;

level two logic block, said level two logic block receiving enabling output signals of said level one logic block, said enabling output signals indicative of any of said inputs to said level one logic block indicating a modified condition, said enabling output signals serving to enable said level two logic block; and level three logic block, said level three logic block being enabled by receipt of an enabling signal output by said level two logic block when said level two logic block is enabled;

wherein said encoder, for each of said inputs indicative of said modified condition, outputs a distinct index address and a distinct associativity address, said outputs being prioritized.

8. A method for determining an index address and an associativity address of a modified memory cell in a cache memory of a digital computer, comprising the steps of:

observing simultaneously several of said memory cells;

detecting whether any of said memory cells are modified;

outputting said index address and said associativity address corresponding to each of said memory cells that is modified; and prioritizing said steps of outputting, if more than one, so that only a single one of said index address and said associativity address corresponding to said modified memory cell is output at any time.

9. A device for determining an index address and an associativity address of a modified memory cell in a cache memory of a digital computer, comprising:

circuitry for observing simultaneously several of said memory cells;

circuitry for detecting whether any of said memory cells are modified;

circuitry for outputting said index address and said associativity address corresponding to each of said memory cells that is modified; and circuitry for prioritizing said steps of outputting, if more than one, so that only a single one of said index address and said associativity address corresponding to said modified memory cell is output at any time.

10. A method for determining an index and an associativity of a modified memory cell of an array of memory cells, comprising the steps of:

simultaneously monitoring several of said memory cells and detecting signals indicative of a modified or unmodified status of each of several memory cells of said array of memory cells;

determining whether any of said signals detected indicates one or more of said several memory cells is modified;

determining an index of each of said modified memory cells;

determining an associativity of each of said modified memory cells;

logically choosing any of said signals indicative of said one or more of said modified memory cells for each of said determining steps; and logically enabling any of said signals indicative of said one or more of said modified memory cells for each of said determining steps.

11. A device for determining an index and an associativity of a modified memory cell of an array of memory cells, comprising:

circuitry for simultaneously monitoring several of said memory cells and for detecting signals indicative of a modified or unmodified status of each of several memory cells of said array of memory cells;

circuitry for determining whether any of said signals detected indicates one or more of said several memory cells is modified;

circuitry for determining an index of each of said modified memory cells;

circuitry for determining an associativity of each of said modified memory cells;

circuitry for logically choosing any of said signals indicative of said one or more of said modified memory cells for each of said determining steps; and circuitry for logically enabling any of said signals indicative of said one or more of said modified memory cells for each of said determining steps.

* * * * *

UNITED STATES PATENT AND TRADEMARK OFFICE
CERTIFICATE OF CORRECTION

PATENT NO. : 5,581,730
DATED : December 3, 1996
INVENTOR(S) : SILLA

It is certified that error appears in the above-identified patent and that said Letters Patent is hereby corrected as shown below:

Col. 10, line 10: delete --has been modified--.

Signed and Sealed this

Twenty-seventh Day of March, 2001

Attest:

NICHOLAS P. GODICI

Attesting Officer

Acting Director of the United States Patent and Trademark Office